(12) United States Patent
Ohno et al.

(10) Patent No.: US 8,085,335 B2
(45) Date of Patent: Dec. 27, 2011

(54) IMAGE PICKUP APPARATUS WITH A FIXED APERTURE STOP HAVING AN APERTURE WITH DIFFERENT, REPETITIVE FIRST AND SECOND WAVE PATTERNS

(75) Inventors: Tsuyoshi Ohno, Tokyo (JP); Hitoshi Nakanishi, Kanagawa (JP); Toshiaki Edamitsu, Ibaraki (JP)

(73) Assignee: Sony Corporation, Tokyo (JP)

( * ) Notice: Subject to any disclaimer, the term of this patent is extended or adjusted under 35 U.S.C. 154(b) by 380 days.

(21) Appl. No.: 12/314,636

(22) Filed: Dec. 15, 2008

(65) Prior Publication Data

US 2009/0185065 A1  Jul. 23, 2009

(30) Foreign Application Priority Data

Jan. 22, 2008  (JP) .................. 2008-011149

(51) Int. Cl.
*H04N 5/225*  (2006.01)
(52) U.S. Cl. ........ 348/337; 348/362; 348/340; 348/336; 359/739; 396/449; 396/505
(58) Field of Classification Search .................. None
See application file for complete search history.

(56) References Cited

U.S. PATENT DOCUMENTS

| | | | |
|---|---|---|---|
| 3,675,562 A * | 7/1972 | Sanada et al. | ................. 396/510 |
| 3,977,772 A | 8/1976 | Rimmer et al. | |
| 5,422,697 A | 6/1995 | Ichinomiya et al. | |
| 5,706,051 A | 1/1998 | Mogamiya | |
| 2007/0154207 A1 | 7/2007 | Saito et al. | |

FOREIGN PATENT DOCUMENTS

| | | |
|---|---|---|
| JP | 05-281590 A | 10/1993 |
| JP | 08-297240 A | 11/1996 |
| JP | 10-257510 A | 9/1998 |
| JP | 2002-229095 | 8/2002 |
| JP | 2006-186936 | 7/2006 |
| JP | 2007-178823 A | 7/2007 |

OTHER PUBLICATIONS

European Search Report issued Jun. 2, 2009 for corresponding European Application No. 08 25 4026.
Japanese Office Action issued Nov. 10, 2009 for corresponding Japanese Application No. 2008-011149.

* cited by examiner

*Primary Examiner* — David Ometz
*Assistant Examiner* — Angel L Garces-Rivera
(74) *Attorney, Agent, or Firm* — Rader Fishman & Grauer PLLC

(57) ABSTRACT

An image pickup apparatus includes an image-pickup optical system, three color separation prisms separating incident light guided by the image-pickup optical system into three-primary-color light components and emitting the light components, and three image pickup elements respectively receiving the three light components from the prisms so as to produce respective image signals. Of the three prisms, a first prism that first receives the incident light has an edge extending parallel to an incidence plane. The image-pickup optical system has a plate-like fixed aperture stop disposed between the first prism and a final lens, disposed closest to the first prism, of multiple lenses included in the image-pickup optical system. The fixed aperture stop has an aperture that limits the incident light. An edge section of the aperture has projections and depressions arranged at least in parallel to the edge, as viewed from an optical-axis direction of the final lens.

8 Claims, 12 Drawing Sheets

IMAGE PICKUP APPARATUS WITH A FIXED APERTURE STOP HAVING AN APERTURE WITH DIFFERENT, REPETITIVE FIRST AND SECOND WAVE PATTERNS

CROSS REFERENCES TO RELATED APPLICATIONS

The present invention contains subject matter related to Japanese Patent Application JP 2008-011149 filed in the Japanese Patent Office on Jan. 22, 2008, the entire contents of which are incorporated herein by reference.

BACKGROUND OF THE INVENTION

1. Field of the Invention

The present invention relates to image pickup apparatuses.

2. Description of the Related Art

In related art, an image pickup apparatus, such as a video camcorder, is provided, which includes an image-pickup optical system, a color separation prism constituted by three prisms that separate incident light guided by the image-pickup optical system into three light components of the three primary colors and emit the three light components, and three image pickup elements that respectively receive the three light components emitted from the three prisms of the color separation prism so as to produce image signals. See Japanese Unexamined Patent Application Publication No. 2006-186936 for an example of such an image pickup apparatus.

With regard to a light beam transmitted through the image-pickup optical system, there is a portion of the light beam which travels through the vicinity of an edge of each of the prisms, when the color separation prism is viewed from the optical-axis direction of the image-pickup optical system.

When this portion of the light beam enters the edges of prisms, the light beam is reflected, refracted, and scattered at these edges, thus producing extraordinary light. If this extraordinary light reaches the image pickup elements, a problem may occur, such as flare formed on picked-up images.

To prevent such flare, a fixed aperture stop is provided between the color separation prism and a final lens, which is disposed closest to the color separation prism, of a plurality of lenses constituting the image-pickup optical system.

Specifically, the fixed aperture stop has an aperture that limits the incident light. An edge section of the aperture blocks the portion of the light beam traveling through the vicinity of the edges so as to prevent the portion of the light beam from reaching the edges. Normally, an effective image pickup range in an image pickup face of each image pickup element is horizontally oblong such that the horizontal axis of the effective image pickup range is greater than the vertical axis thereof.

Therefore, by arranging the image pickup elements along the shorter-side direction thereof (i.e., the vertical direction thereof), the space occupied by the image pickup elements and the prisms can be reduced, which is advantageous toward achieving size reduction. In this case, the directions of color separation by the color separation prism are orthogonal to the faces of the prisms that face the corresponding image pickup elements (i.e., the faces from which the color-separated light components are released), and the edges of the prisms are located above and below the optical path of the image-pickup optical system.

A light beam that causes problems like flare is a light beam that passes through the vicinity of the edges of the color separation prism. This implies that a light beam that should be limited by the fixed aperture stop is a light beam that travels above and below the optical path of the image-pickup optical system. Therefore, the light-beam limitation by the fixed aperture stop should be carried out actively above and below the optical path of the image-pickup optical system.

On the other hand, the longer-side direction (i.e., the horizontal direction) of the image pickup elements is orthogonal to the directions of color separation and is not directly relevant to the color separation. Therefore, it may not be necessary to actively carry out the light-beam limitation by the fixed aperture stop with respect to the horizontal direction.

Thus, the edge section in the fixed aperture stop has linear segments and arc segments. Specifically, as viewed from the optical-axis direction of the final lens, the linear segments each extend on an imaginary line orthogonal to an imaginary line extending along the optical axis, and the linear segments are provided at two opposite locations of the edge section and extend parallel to each other.

The two linear segments are used for limiting a light beam traveling above and below the optical path of the image-pickup optical system.

SUMMARY OF THE INVENTION

However, when strong light from a bright subject, such as sunlight or light from a light source, enters the linear segments, a diffraction phenomenon occurs. As a result, linearly-extending crepuscular rays (diffracted crepuscular rays) appear on images picked up by the image pickup elements, thus disadvantageously impairing the quality of picked-up images.

It is desirable to provide an image pickup apparatus that can reliably prevent the occurrence of diffraction phenomenon by the fixed aperture stop so as advantageously achieve an improved quality of picked-up images.

An image pickup apparatus according to an embodiment of the present invention includes an image-pickup optical system, three color separation prisms that separate incident light guided by the image-pickup optical system into three light components of three primary colors and that emit the three light components, and three image pickup elements that respectively receive the three light components emitted from the color separation prisms so as to produce image signals corresponding to the three light components. Of the three color separation prisms, a first color separation prism that first receives the incident light has an edge extending parallel to an incidence plane. The image-pickup optical system includes a plurality of lenses, one of the lenses being a final lens disposed closest to the first color separation prism, and the image-pickup optical system has a plate-like fixed aperture stop disposed between the final lens and the first color separation prism. The fixed aperture stop has an aperture that limits the incident light. An edge section of the aperture has a plurality of projections and depressions arranged at least in parallel to the edge, as viewed from an optical-axis direction of the final lens.

According to the above embodiment of the present invention, since the edge section that borders the aperture of the fixed aperture stop has a plurality of projections and depressions arranged at least in parallel to the edge of the first color separation prism, as viewed from the optical-axis direction of the final lens, the projections and depressions can prevent diffraction from occurring, thereby reliably preventing crepuscular rays from appearing on picked-up images.

DESCRIPTION OF THE PREFERRED EMBODIMENTS

First Embodiment

A first embodiment of the present invention will be described below with reference to the drawings.

A schematic configuration of an image pickup apparatus according to the first embodiment will be described first.

Figure 1:
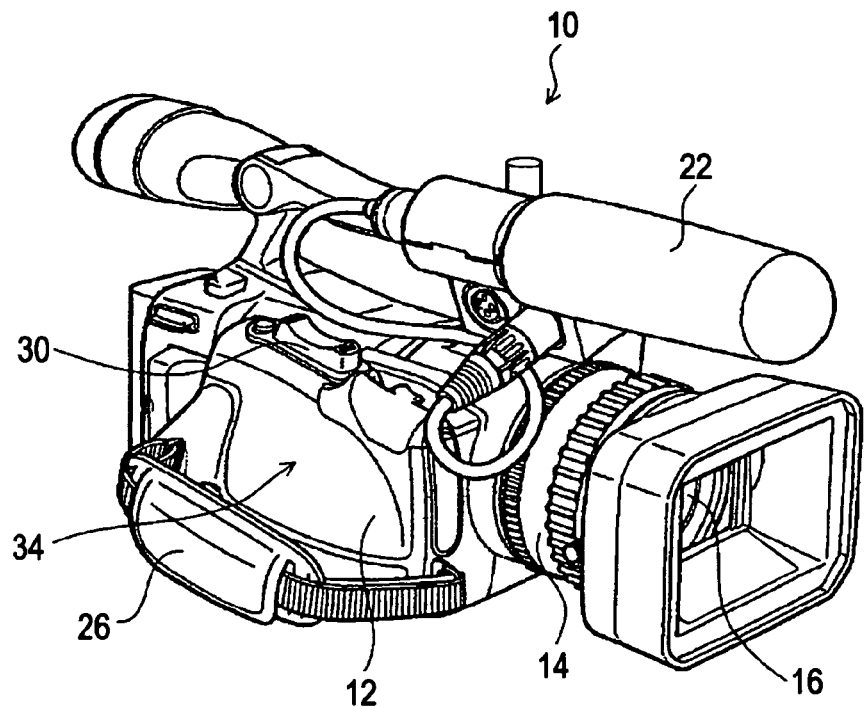
FIG. 1 is a perspective view of an image pickup apparatus, as viewed from the front side thereof.
Figure 2:
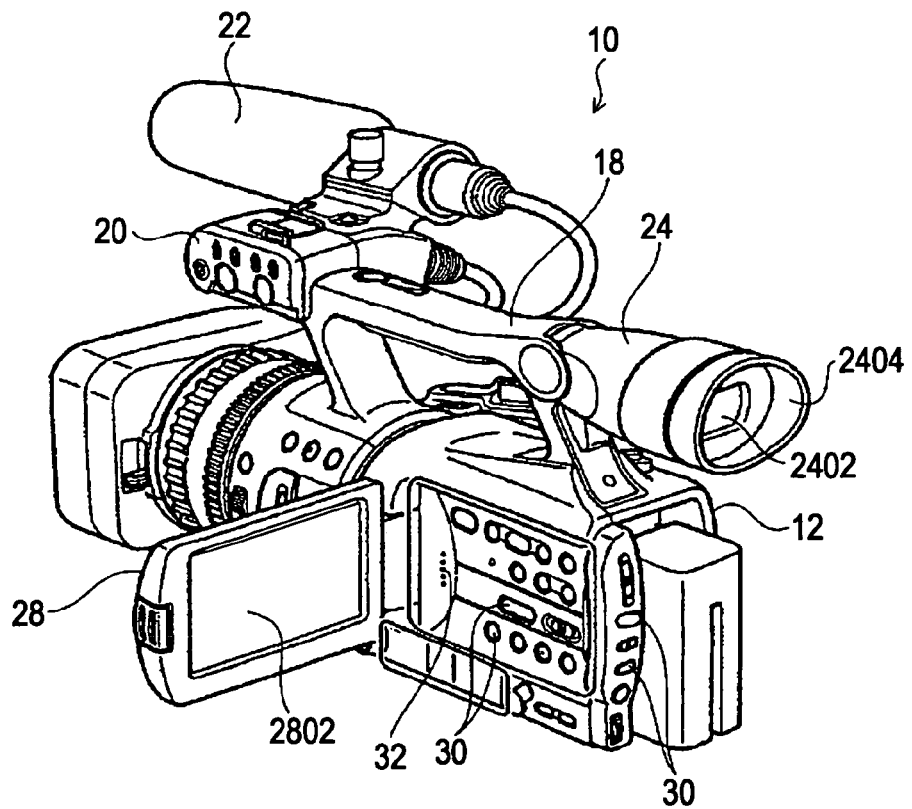
FIG. 2 is a perspective view of the image pickup apparatus, as viewed from the rear side thereof.

FIG. 1 is a perspective view of an image pickup apparatus 10, as viewed from the front side thereof. FIG. 2 is a perspective view of the image pickup apparatus 10, as viewed from the rear side thereof.

As shown in FIGS. 1 and 2, the image pickup apparatus 10 is a video camcorder. The image pickup apparatus 10 has a housing 12. The length of the housing 12 in the front-rear direction and the height thereof in the up-down direction are both greater than the width thereof in the left-right direction. In this specification, the terms "left" and "right" are used to define the left and right sides of the image pickup apparatus 10 when viewed from the rear side, the term "front" refers to the subject side, and the term "rear" refers to the opposite side of the subject side.

A front portion of the housing 12 is provided with a lens barrel 14. The lens barrel 14 accommodates a plurality of lenses that constitute an image-pickup optical system 16.

Figure 3:
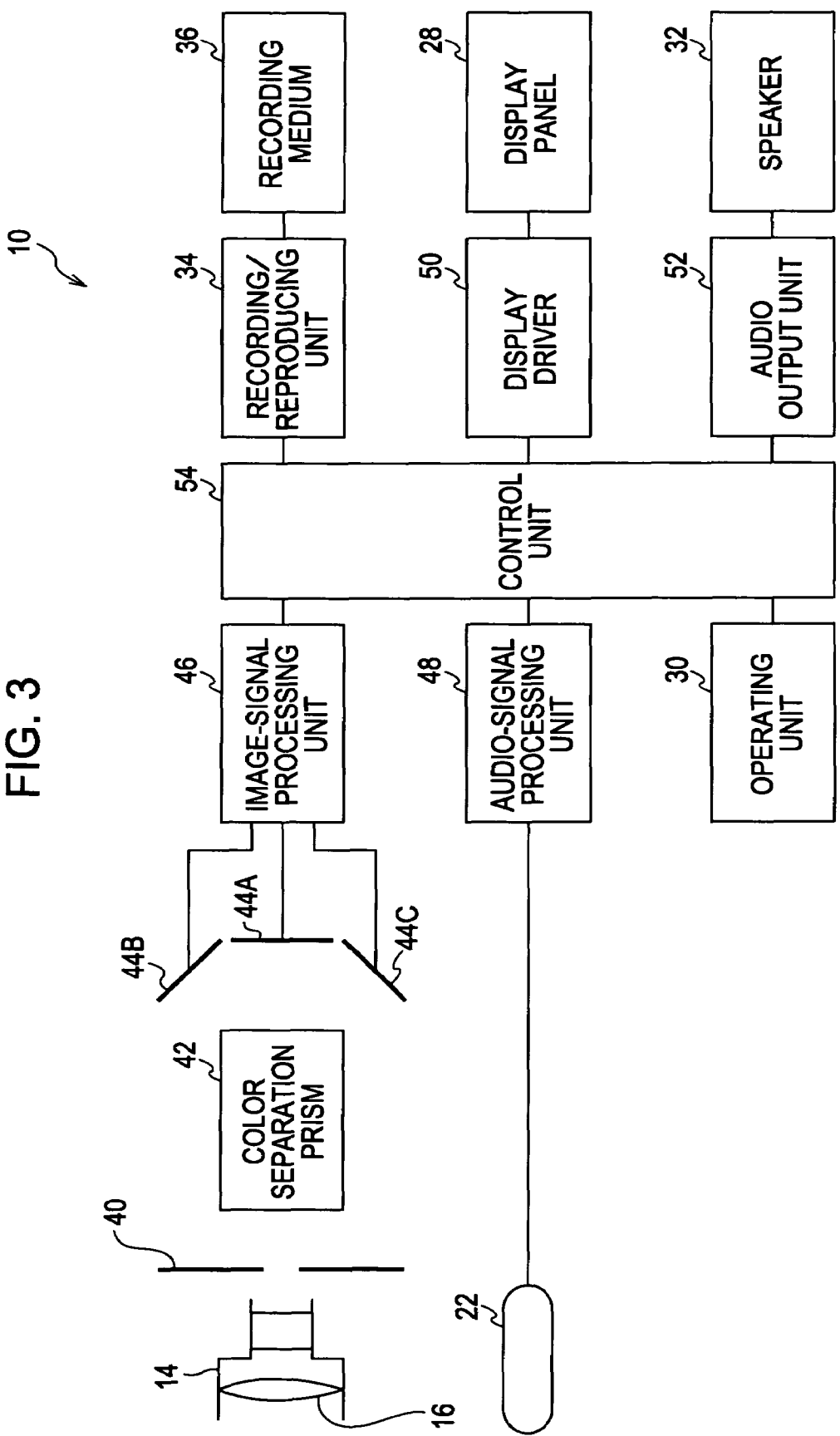
FIG. 3 is a block diagram of a control system of the image pickup apparatus according to a first embodiment.

Referring to FIG. 3, inside the housing 12, a fixed aperture stop 40, a color separation prism 42, and first to third image pickup elements 44A, 44B, and 44C are provided behind the lens barrel 14. The fixed aperture stop 40 is included in the image-pickup optical system 16.

A handlebar 18 extending in the front-rear direction is provided on the upper surface of the housing 12 such that the handlebar 18 is spaced apart from the upper surface by a certain distance.

A front portion of the handlebar 18 is connected to an attachment portion 20 for attaching accessories thereto. A microphone 22 extending in the front-rear direction and oriented towards the front is attached to the right side of the attachment portion 20.

A rear portion of the handlebar 18 is provided with a viewfinder device 24 that is tiltable in the up-down direction.

A rear end of the viewfinder device 24 is provided with an eyepiece 2402. The eyepiece 2402 is surrounded by a tubular eye-cup 2404 having an opening faced towards the rear.

A grip belt 26 is joined to front and rear sections on the right side of the housing 12. By inserting the user's right hand into between the grip belt 26 and the right side of the housing 12, the user can securely hold the housing 12.

A rectangular display panel 28 is joined to a forward section on the left side of the housing 12 in an openable-closable fashion about a first axis extending in the up-down direction and also in a tiltable fashion about a second axis orthogonal to the first axis.

The display panel 28 has a display face 2802 disposed therein. The display face 2802 displays an image of a subject picked up by the first to third image pickup elements 44A, 44B, and 44C.

Accordingly, by rotating the display panel 28 about the first axis, the display panel 28 can be moved between a stored position in which the display face 2802 faces the left side surface of the housing 12 and an opened position in which the display face 2802 faces towards the rear, as shown in FIG. 2. Moreover, by tilting the display panel 28, when in the opened position, about the second axis, the orientation of the display face 2802 can be changed in the up-down direction.

The upper surface, the left side surface, and the rear surface of the housing 12 are provided with a plurality of operating members 30 to be used for operating the image pickup apparatus 10, and moreover, the left side surface of the housing 12 is also provided with a speaker 32 for audio output. The right side of the housing 12 is provided with a recording/reproducing unit 34 that records and/or reproduces image data of an image picked up by the first to third image pickup elements 44A, 44B, and 44C and audio data picked up by the microphone 22 onto or from a recording medium 36 (FIG. 3). Examples of the recording medium 36 include a hard disk, an optical disc, a memory card, and a magnetic recording tape.

FIG. 3 is a block diagram of a control system of the image pickup apparatus 10 according to this embodiment.

As shown in FIG. 3, in addition to the lens barrel 14, the image-pickup optical system 16, the fixed aperture stop 40, the color separation prism 42, and the first to third image pickup elements 44A, 44B, and 44C described above, the image pickup apparatus 10 includes an image-signal processing unit 46, an audio-signal processing unit 48, a display driver 50, an audio output unit 52, and a control unit 54.

The fixed aperture stop 40 is configured to limit a subject image guided by the image-pickup optical system 16, namely, to limit the flux of incident light that forms the subject image, and will be described later.

The color separation prism 42 is configured to separate the incident light passing through the fixed aperture stop 40 into light components of the three primary colors (i.e., red, green, and blue).

Figure 4:
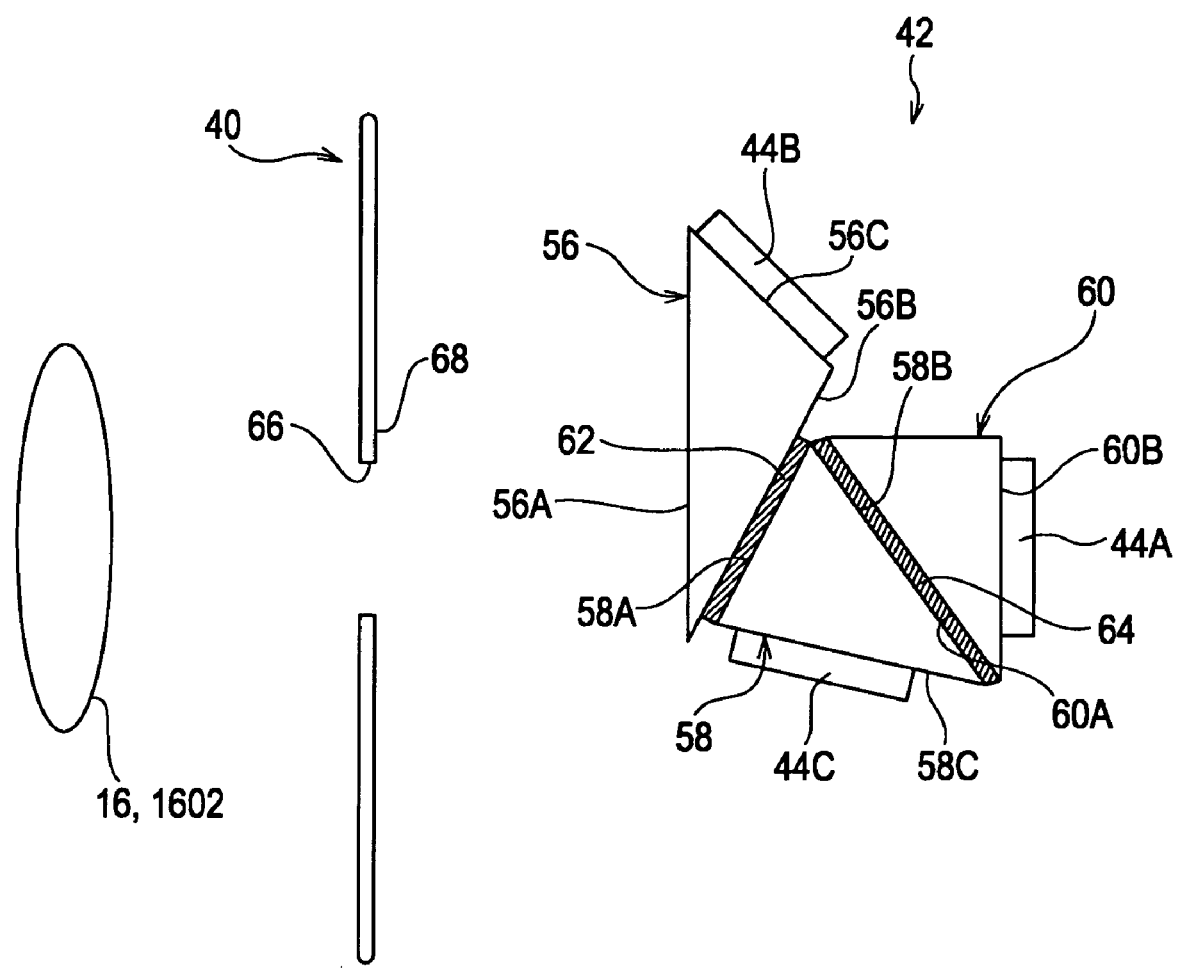
FIG. 4 is a schematic diagram showing the configuration of an image-pickup optical system, a fixed aperture stop, a color separation prism, and first to third image pickup elements.

Of the plurality of lenses constituting the image-pickup optical system 16, a lens disposed closest to the color separation prism 42 will be referred to as a final lens 1602 (FIG. 4). In this case, the fixed aperture stop 40 is disposed between the color separation prism 42 and the final lens 1602.

The first to third image pickup elements 44A, 44B, and 44C are provided in correspondence to the three primary colors (i.e., red, green, and blue), and are configured to respectively receive the three-primary-color (red, green, and blue) light components separated by the color separation prism 42 to pick up images thereof, so as to produce image signals.

The image-signal processing unit 46 is configured to drive the first to third image pickup elements 44A, 44B, and 44C. Furthermore, with respect to the image signals received from the image pickup elements 44A, 44B, and 44C, the image-signal processing unit 46 performs, for example, correlated double sampling (CDS) to maintain a favorable S/N ratio, performs automatic gain control (AGC) to control the gain, performs analog/digital (A/D) conversion to carry out a series of preparation processes, such as for producing image data as a digital signal, and encodes the prepared image data by using a predetermined encoding method so as to produce the aforementioned image data to be recorded. The produced image data to be recorded is sent to the recording/reproducing unit 34 via the control unit 54.

Furthermore, the image-signal processing unit 46 sends the prepared image signal to the display panel 28 via the display driver 50 so as to cause the display panel 28 to display an image being picked up.

Moreover, the image-signal processing unit 46 decodes image data reproduced by the recording/reproducing unit 34 and received via the control unit 54, and sends the decoded image data to be reproduced to the display panel 28 via the display driver 50 so as to cause the display panel 28 to display the reproduced image.

The audio-signal processing unit 48 performs predetermined signal processing, including encoding, on an audio signal received from the microphone 22 so as to produce predetermined audio data, and sends the audio data to the recording/reproducing unit 34 via the control unit 54.

Furthermore, the audio-signal processing unit 48 performs predetermined signal processing, including decoding, on audio data received from the recording/reproducing unit 34 via the control unit 54 so as to produce an audio signal, and sends the audio signal to the audio output unit 52 via the control unit 54.

The display driver 50 drives the display panel 28 based on image data received via the control unit 54 so as to cause the display panel 28 to display an image.

The audio output unit 52 drives the speaker 32 based on audio data received via the control unit 54 so as to cause the speaker 32 to output sound therefrom.

The control unit 54 is configured to control the operating members 30, the recording/reproducing unit 34, the image-signal processing unit 46, the audio-signal processing unit 48, the display driver 50, and the audio output unit 52.

In detail, the control unit 54 is constituted by a microcomputer containing a peripheral large-scale integrated (LSI) circuit for exchanging control signals and data signals between a central processing unit (CPU), a random-access memory (RAM) that provides a working area, a read-only memory (ROM) that stores control programs, the recording/reproducing unit 34, the image-signal processing unit 46, the audio-signal processing unit 48, the display driver 50, and the audio output unit 52. By allowing the CPU to execute the control programs in the ROM, the control unit 54 can perform various control operations.

The color separation prism 42 will be described next.

FIG. 4 is a schematic diagram showing the configuration of the image-pickup optical system 16, the fixed aperture stop 40, the color separation prism 42, and the first to third image pickup elements 44A, 44B, and 44C.

In this embodiment, the color separation prism 42 includes three prisms, i.e., first to third prisms 56, 58, and 60, and first and second dichroic films 62 and 64.

The first prism 56 serves as a first color separation prism that first receives incident light guided by the image-pickup optical system 16, and has three faces, namely, a first face 56A, a second face 56B, and a third face 56C.

The first face 56A faces the fixed aperture stop 40 so as to be positioned orthogonally to an optical axis of the final lens 1602. The second face 56B has the first dichroic film 62 formed thereon. The third face 56C faces an image pickup face of the second image pickup element 44B.

The second prism 58 has three faces, namely, a first face 58A, a second face 58B, and a third face 58C.

The first face 58A faces the second face 56B of the first prism 56 across the first dichroic film 62. The second face 58B has the second dichroic film 64 formed thereon. The third face 58C faces an image pickup face of the third image pickup element 44C.

The third prism 60 has three faces, namely, a first face 60A, a second face 60B, and a third face 60C.

The first face 60A faces the second face 58B of the second prism 58 across the second dichroic film 64. The second face 60B faces an image pickup face of the first image pickup element 44A.

The first prism 56 and the second prism 58 are fixed to each other by adhering the second face 56B of the first prism 56 and the first face 58A of the second prism 58 to each other with an adhesive.

The second prism 58 and the third prism 60 are fixed to each other by adhering the second face 58B of the second prism 58 and the first face 60A of the third prism 60 to each other with an adhesive.

Accordingly, the first, second, and third prisms 56, 58, and 60 are provided in an integrated fashion.

The first dichroic film 62 has a function of reflecting green light and transmitting blue light and red light.

The second dichroic film 64 has a function of reflecting blue light and transmitting red light.

Consequently, after incident light passing through the fixed aperture stop 40 travels through the first face 56A of the first prism 56, a green light component of the incident light is reflected by the first dichroic film 62 and passes through the third face 56C so as to be guided to the image pickup face of the second image pickup element 44B.

On the other hand, blue and red light components of the incident light are transmitted through the first dichroic film 62 and then pass through the first face 58A of the second prism 58 so as to reach the second dichroic film 64.

Then, the red light component is transmitted through the second dichroic film 64 and passes through the first face 60A and the second face 60B of the third prism 60 so as to be guided to the image pickup face of the first image pickup element 44A.

On the other hand, the blue light component is reflected by the second dichroic film 64 and passes through the third face 58C of the second prism 58 so as to be guided to the image pickup face of the third image pickup element 44C.

In this manner, the incident light passing through the fixed aperture stop 40 is separated into the light components of the three primary colors, which are respectively guided to the first to third image pickup elements 44A, 44B, and 44C.

Here, the directions in which the incident light is to be separated into the light components of the three primary colors, that is, directions of color separation, are orthogonal to the third face 56C of the first prism 56, the third face 58C of the second prism 58, and the third face 60C of the third prism 60, respectively. Therefore, an edge E1 where the first face 56A and the second face 56B of the first prism 56 meet (i.e., an edge extending parallel to an incidence plane of the first prism 56) and an edge E2 where the first face 58A and the third face 58C of the second prism 58 meet are located below the optical path of the image-pickup optical system 16, whereas an edge E3 where the first face 58A and the second face 58B of the second prism 58 meet and an edge E4 where the first face 60A and the third face 60C of the third prism 60 meet are located above the optical path of the image-pickup optical system 16.

The configuration of the color separation prism 42 is not limited to that in this embodiment, and various configurations of related art are employable. In addition, the order in which color separation is performed on incident light is not limited to the order in which the color separation prism 42 performs the color separation in this embodiment.

Furthermore, the first to third prisms 56, 58, and 60 and the first to third image pickup elements 44A, 44B, and 44C may respectively have, for example, trimming filters disposed therebetween.

Figure 5:
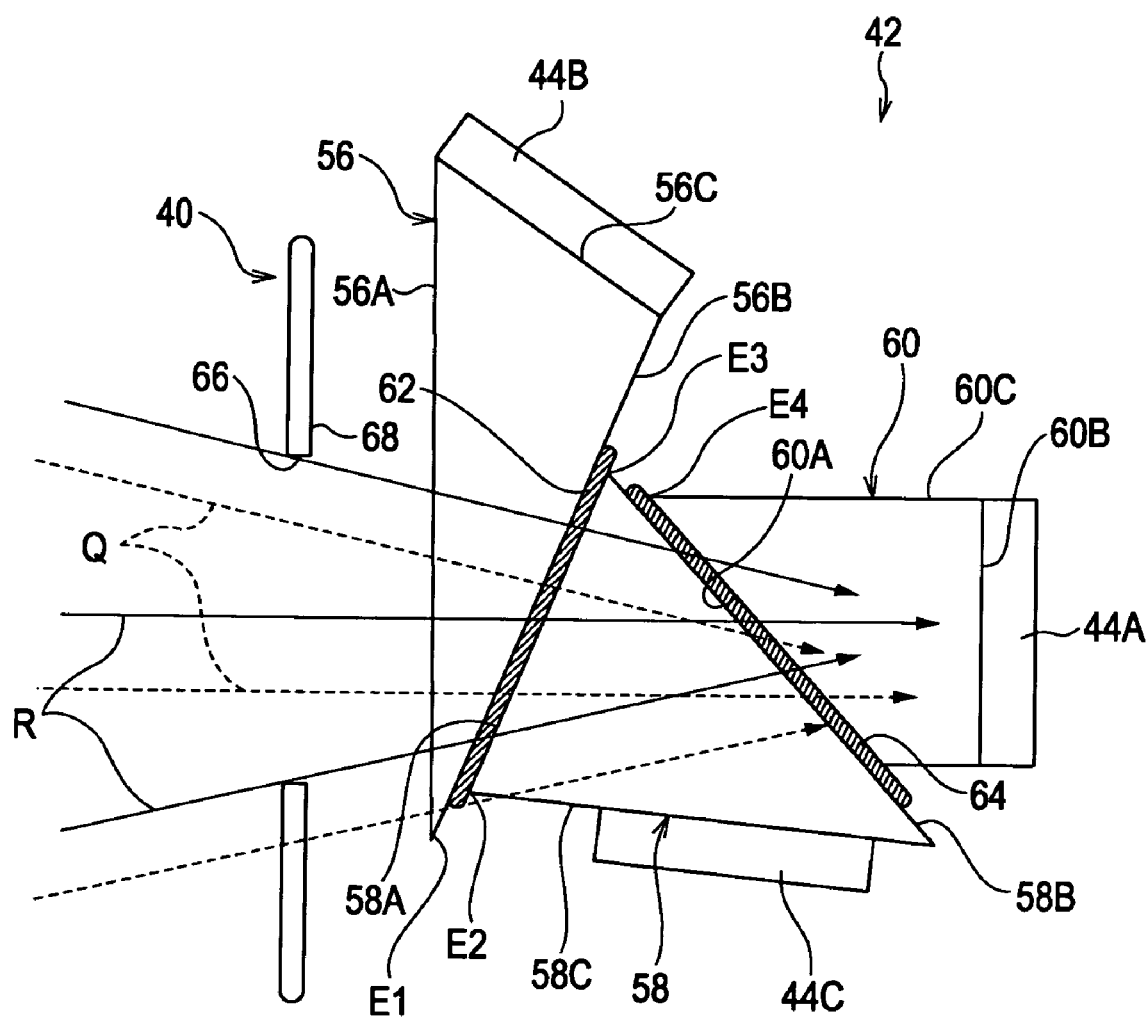
FIG. 5 is a schematic diagram of a light beam entering the color separation prism (color-separation optical system)

FIG. 5 is a schematic diagram of a light beam entering the color separation prism 42 (color-separation optical system).

As shown in FIG. 5, a light beam transmitted through the image-pickup optical system 16 to enter the color separation prism 42 (color-separation optical system) normally passes through the first to third prisms 56, 58, and 60, as indicated by a solid line R.

However, with regard to a light beam transmitted through the image-pickup optical system 16, there is also a portion of the light beam which travels through the vicinity of the aforementioned edges E1 and E2, as indicated by a dotted line Q, when the color separation prism 42 is viewed from the optical-axis direction.

When this light beam Q enters the color separation prism 42 in this manner, the light beam Q becomes incident on, for example, the edge E1 or the edge E2.

The light beam Q is then reflected, refracted, and scattered at the edge E1 or E2, thus producing extraordinary light. If this extraordinary light reaches the image pickup elements 44A, 44B, and 44C, a problem may occur, such as flare formed on picked-up images.

Likewise, if the light beam Q is received by, for example, the edge E3 or the edge E4, the light beam Q is reflected, refracted, and scattered at the edge E3 or E4, thus producing extraordinary light. If this extraordinary light reaches the image pickup elements 44A, 44B, and 44C, a problem may occur, such as flare formed on picked-up images.

To prevent such flare, the fixed aperture stop 40 in the form of a plate is provided between the color separation prism 42 and the final lens 1602, which is disposed closest to the color separation prism 42, of the plurality of lenses constituting the image-pickup optical system 16, as shown in FIG. 4.

Specifically, as shown in FIG. 5, the fixed aperture stop 40 has an aperture 66 that limits the incident light. An edge section 68 of the aperture 66 blocks a portion of the light beam Q so as to prevent the portion of the light beam Q from reaching the edges E1, E2, E3, and E4.

The directions in which the fixed aperture stop 40 limits a light beam will be described below.

Normally, an effective image pickup range in the image pickup face of each of the image pickup elements 44A, 44B, and 44C is horizontally oblong, and the ratio of the horizontal axis to the vertical axis of the effective image pickup range is similar to that of a television monitor, which is 4:3 or 16:9.

Therefore, by arranging the image pickup elements 44A, 44B, and 44C along the shorter-side direction thereof (i.e., the vertical direction thereof), the space occupied by the image pickup elements 44A, 44B, and 44C and the first to third prisms 56, 58, and 60 can be reduced, which is advantageous toward achieving size reduction.

Consequently, in this case, the directions of color separation by the color separation prism 42 are orthogonal to the third face 56C of the first prism 56, the third face 58C of the second prism 58, and the third face 60C of the third prism 60. Moreover, as mentioned above, the edge E1 and the edge E2 are located below the optical path of the image-pickup optical system 16, and the edge E3 and the edge E4 are located above the optical path of the image-pickup optical system 16.

As mentioned above, the light beam Q, which can cause problems like flare, is a light beam that passes through the vicinity of the edges E1 to E4 of the color separation prism 42. This implies that the light beam Q that should be limited by the fixed aperture stop 40 is a light beam that travels above and below the optical path of the image-pickup optical system 16. Therefore, the light-beam limitation by the fixed aperture stop 40 should be carried out actively above and below the optical path of the image-pickup optical system 16.

On the other hand, the longer-side direction (i.e., the horizontal direction) of the image pickup elements 44A, 44B, and 44C is orthogonal to the directions of color separation and is not directly relevant to the color separation. Therefore, it may not be necessary to actively carry out the light-beam limitation by the fixed aperture stop 40 with respect to the horizontal direction.

Figure 6:
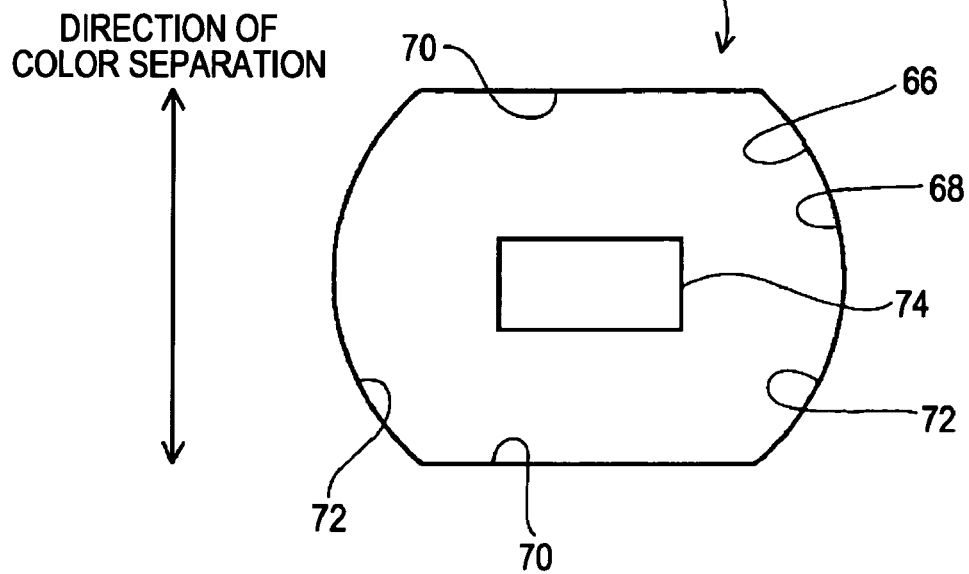
FIG. 6 schematically illustrates an aperture of the fixed aperture stop according to the first embodiment.

FIG. 6 schematically illustrates the aperture 66 of the fixed aperture stop 40 according to the first embodiment.

Figure 7:
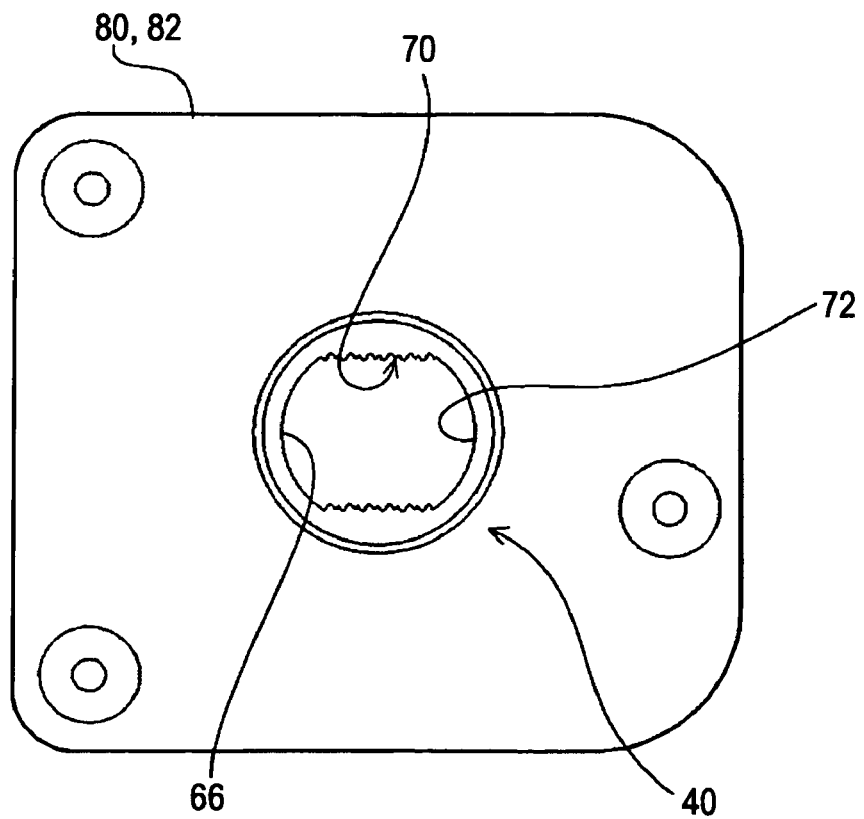
FIG. 7 is a plan view showing a holder for mounting the color separation prism according to the first embodiment thereon, as viewed from the image-pickup optical system side.
Figure 8:
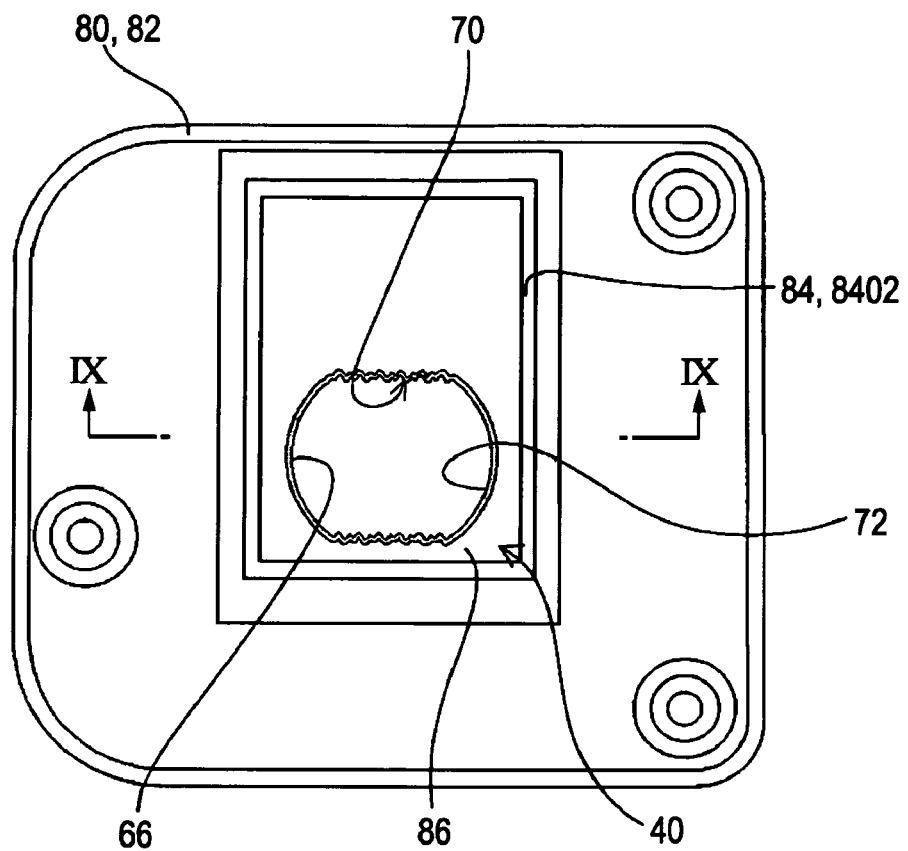
FIG. 8 is a plan view showing the holder for mounting the color separation prism according to the first embodiment thereon, as viewed from the color separation prism side.
Figure 9:
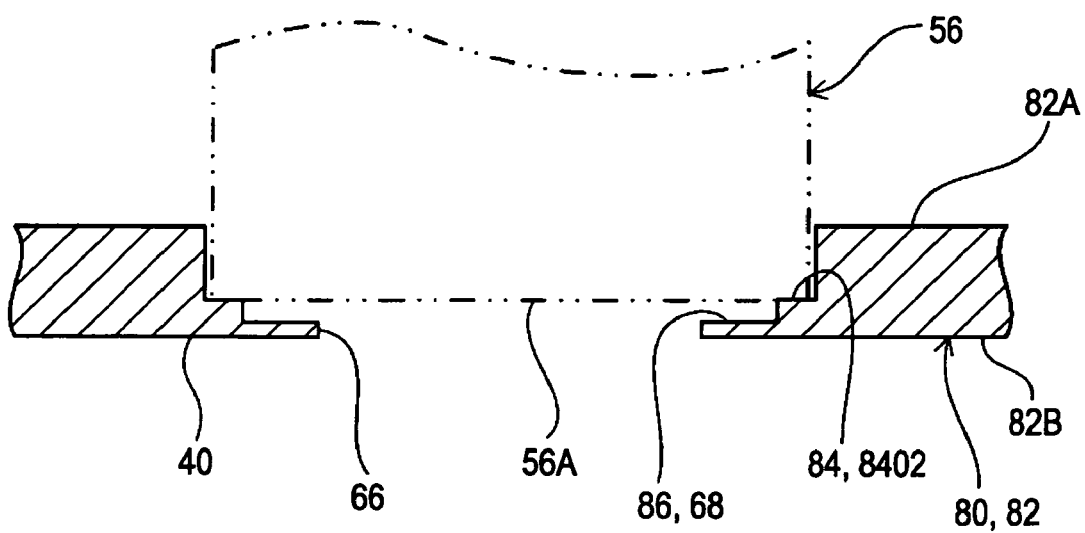
FIG. 9 is a cross-sectional view taken along line IX-IX in FIG. 8.

FIG. 7 is a plan view showing a holder for mounting the color separation prism 42 according to the first embodiment thereon, as viewed from the image-pickup optical system 16 side. FIG. 8 is a plan view showing the holder for mounting the color separation prism 42 according to the first embodiment thereon, as viewed from the color separation prism 42 side. FIG. 9 is a cross-sectional view taken along line IX-IX in FIG. 8.

Figure 10A:
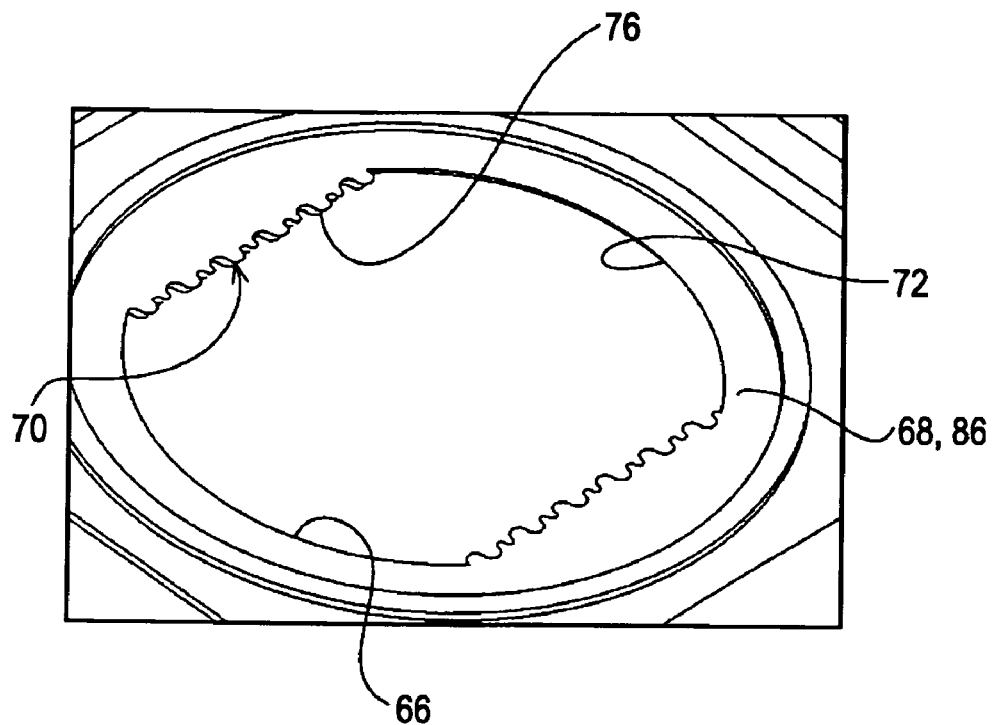
FIG. 10A is a perspective view showing the aperture of the fixed aperture stop, as viewed from the image-pickup optical system side.
Figure 10B:
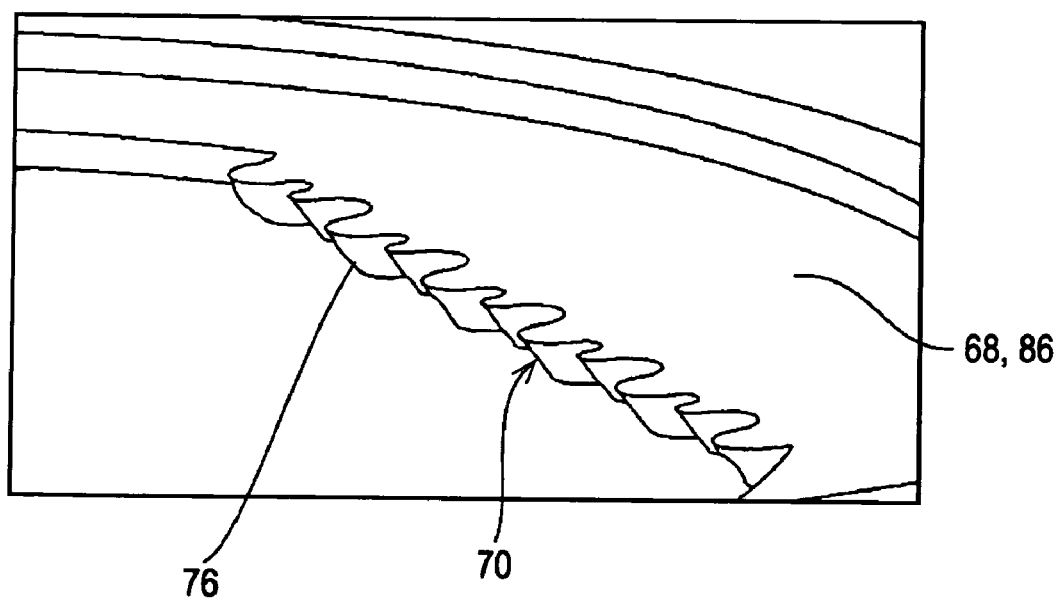
FIG. 10B is an enlarged perspective view of FIG. 10A.

FIG. 10A is a perspective view showing the aperture 66 of the fixed aperture stop 40 according to the first embodiment, as viewed from the image-pickup optical system 16 side. FIG. 10B is an enlarged perspective view of FIG. 10A.

Figure 11A:
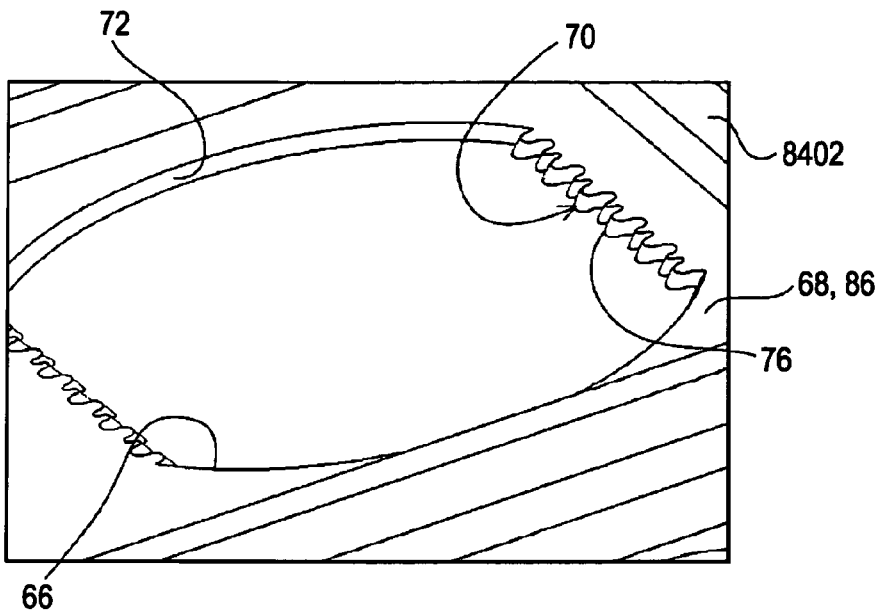
FIG. 11A is a perspective view showing the aperture of the fixed aperture stop, as viewed from the color separation prism side.
Figure 11B:
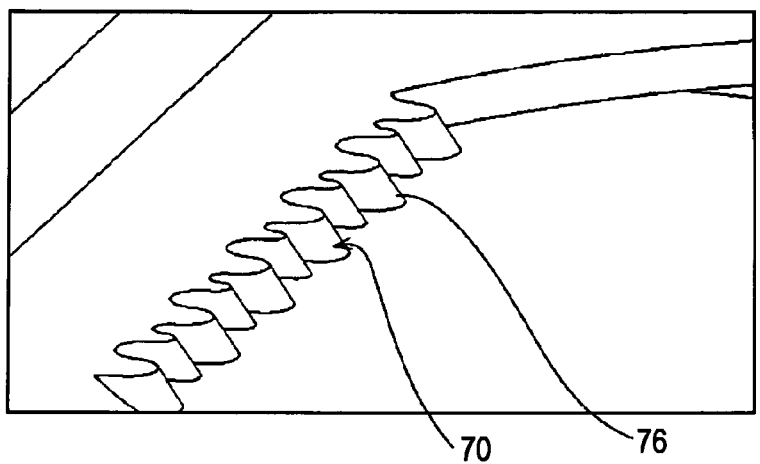
FIGS. 11B and 11C are enlarged perspective views of FIG. 11A.
Figure 11C:
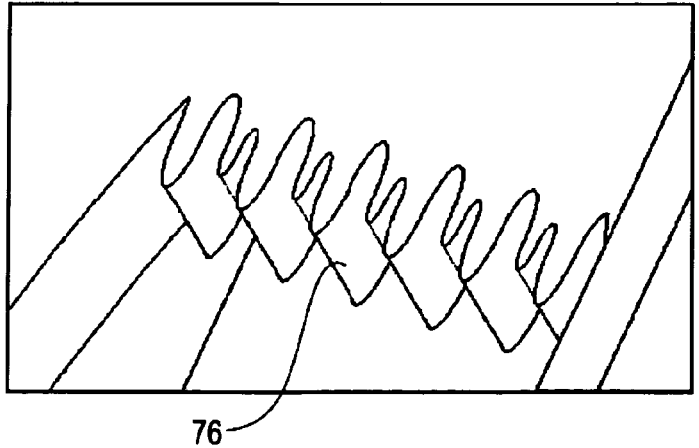

FIG. 11A is a perspective view showing the aperture 66 of the fixed aperture stop 40 according to the first embodiment, as viewed from the color separation prism 42 side. FIGS. 11B and 11C are enlarged perspective views of FIG. 11A.

Figure 12:
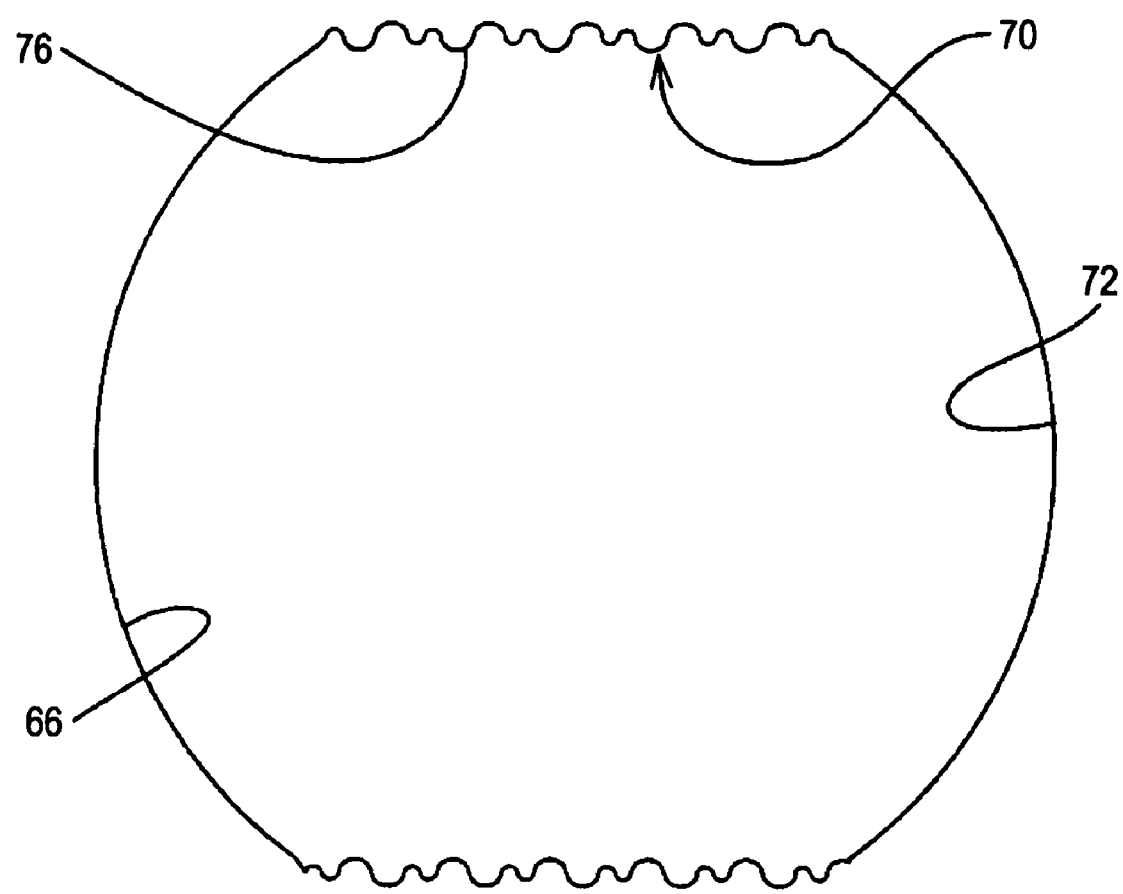
FIG. 12 is a plan view of the aperture of the fixed aperture stop according to the first embodiment.

FIG. 12 is a plan view of the aperture 66 of the fixed aperture stop 40 according to the first embodiment.

Referring to FIGS. 7, 8, and 9, in this embodiment, the fixed aperture stop 40 is defined by a wall 82 of a holder 80 that holds the color separation prism 42.

The wall 82 is in the form of a plate, and one face 82A in the thickness direction thereof is provided with a mounting recess 84 for mounting thereon the first face 56A of the first prism 56 of the color separation prism 42.

A bottom surface 8402 of the mounting recess 84 is flat, and the aperture 66 is formed in this bottom surface 8402. The first face 56A of the first prism 56 is placed in abutment against this bottom surface 8402, and the periphery of the first face 56A is fixed to the bottom surface 8402 with an adhesive.

A flat wall section 86 that surrounds the aperture 66 is provided between the other face 82B of the wall 82 in the thickness direction and the bottom surface 8402. Specifically, the wall section 86 is spaced apart from the first face 56A of the first prism 56 so that a slight gap (of about, for example, 1 mm) is formed between the first face 56A and the wall section 86. Consequently, in this embodiment, the edge section 68 that borders the aperture 66 is defined by an edge of the wall section 86.

Referring to FIG. 6, the edge section 68 of the fixed aperture stop 40 has linear segments 70 and arc segments 72.

As viewed from the optical-axis direction of the final lens 1602, the linear segments 70 each extend on an imaginary line orthogonal to an imaginary line extending along the optical axis, and the linear segments 70 are provided at two opposite locations of the edge section 68 and extend parallel to each other.

Thus, the two linear segments 70 are used for limiting a light beam traveling above and below the optical path of the image-pickup optical system 16 (i.e., a light beam traveling below the optical path of the image-pickup optical system 16 towards the edges E1 and E2 and a light beam traveling above the optical path of the image-pickup optical system 16 towards the edges E3 and E4).

The arc segments 72 extend along a circumference of a circle centered on the optical axis of the final lens 1602 and are connected to the opposite ends of the linear segments 70.

When strong light from a bright subject, such as sunlight or light from a light source, enters the linear segments 70, diffraction occurs, thus creating crepuscular rays extending in certain directions on a picked-up image.

On the other hand, with regard to the arc segments 72, even if a diffraction phenomenon occurs, crepuscular rays caused by the diffraction appear radially in a uniform manner instead of in certain directions. Therefore, the effect the crepuscular rays have on the image quality is negligible.

In this embodiment, the edge section 68 of the aperture 66 has a plurality of projections and depressions 76 arranged at least in parallel to the edge E1, as viewed from the optical-axis direction of the final lens 1602. The plurality of projections and depressions 76 are formed in areas of the edge section 68 that are parallel to the edge E1 and that are opposed to each other.

More specifically, the projections and depressions 76 that prevent the occurrence of diffraction phenomenon are formed entirely on the linear segments 70.

In FIG. 6, reference numeral 74 denotes an effective image pickup range in the image pickup face of each of the image pickup elements 44A, 44B, and 44C. Specifically, this effective image pickup range is where an image of a subject is picked up.

Referring to FIGS. 11A to 11C, the projections and depressions 76 are provided by alternately and repetitively arranging, in an orderly fashion, a first wave pattern, constituted by a semicircular projection and a semicircular depression having a uniform radius, and a second wave pattern, constituted by a semicircular projection and a semicircular depression having a uniform radius with a value different from that of the aforementioned uniform radius. Thus, the projections and depressions 76 form a pattern that appears as if the two kinds of wave patterns are combined.

If the width of the aperture 66 in a direction orthogonal to the linear segments 70 is defined as an aperture width (aperture diameter), when the aperture width is 9.5 mm, a smaller one of the two kinds of wave patterns has a wavelength of 0.4 mm and an amplitude of 0.2 mm, and therefore, the amplitude and the wavelength are 2.1% and 4.2%, respectively, with respect to the aperture width.

When the aperture width is 9.5 mm, a larger one of the two kinds of wave patterns has a wavelength of 0.8 mm and an amplitude of 0.4 mm, and therefore, the amplitude and the wavelength are 4.2% and 8.4%, respectively, with respect to the aperture width.

It is preferable that the amplitude of each wave pattern be set between 1% and 8% with respect to the aperture width in order to ensure a diffraction reducing effect (crepuscular-ray reducing effect) of the projections and depressions 76 and to prevent the wave pattern from being reflected on an image containing an out-of-focus area of a point source so as to ensure the quality of a picked-up image containing an out-of-focus area.

Setting the amplitude of each wave pattern below 1% with respect to the aperture width is disadvantageous in terms of machinability of the projections and depressions 76.

On the other hand, setting the amplitude of each wave pattern above 8% with respect to the aperture width is disadvantageous in that it lowers the diffraction reducing effect (crepuscular-ray reducing effect) of the linear segments 70 and that it causes the wave pattern to be reflected on an image containing an out-of-focus area of a point source, thus lowering the quality of a picked-up image containing an out-of-focus area.

It is preferable that the wavelength of each wave pattern be set between 1% and 16% with respect to the aperture width in order to ensure a diffraction reducing effect (crepuscular-ray reducing effect) of the projections and depressions 76 and to prevent the wave pattern from being reflected on an image containing an out-of-focus area of a point source so as to ensure the quality of a picked-up image containing an out-of-focus area.

Setting the wavelength of each wave pattern below 1% with respect to the aperture width is disadvantageous in terms of machinability of the projections and depressions 76.

On the other hand, setting the wavelength of each wave pattern above 16% with respect to the aperture width is disadvantageous in that it lowers the diffraction reducing effect (crepuscular-ray reducing effect) of the linear segments 70 and that it causes the wave pattern to be reflected on an image containing an out-of-focus area of a point source, thus lowering the quality of a picked-up image containing an out-of-focus area.

According to this embodiment, since the projections and depressions 76 that prevent the occurrence of diffraction phenomenon are formed entirely on the linear segments 70 of the edge section 68 that borders the aperture 66 of the fixed aperture stop 40, the linear segments 70 can prevent undesired light beams from entering the color separation prism 42. Consequently, not only is flare prevented, but crepuscular rays can also be prevented from appearing on a picked-up image since the projections and depressions 76 can prevent diffraction from occurring even when strong light from a bright subject, such as sunlight or light from a light source, enters the linear segments 70. This is advantageous in terms of achieving an improved quality of a picked-up image.

Normally, the aperture 66 of the fixed aperture stop 40 has a certain amount of size, which means that the linear segments 70 have a certain amount of length. For this reason, good machinability of the projections and depressions 76 can be ensured without having to significantly reduce the wavelengths and the amplitudes of the wave patterns constituted by the projections and depressions 76. Therefore, the projections and depressions 76 can be formed readily by, for example, press working or injection molding, thereby advantageously reducing the cost of manufacturing.

Although the wave patterns constituted by the projections and depressions 76 can be arranged randomly in the extending direction of the linear segments 70, the wave patterns constituted by the projections and depressions 76 that are arranged in an orderly fashion in the extending direction of the linear segments 70, as in this embodiment, facilitates the machining of the projections and depressions 76 and the quality control. Accordingly, this embodiment is advantageous in achieving higher mass productivity.

Second Embodiment

A second embodiment of the present invention will now be described.

Figure 13:
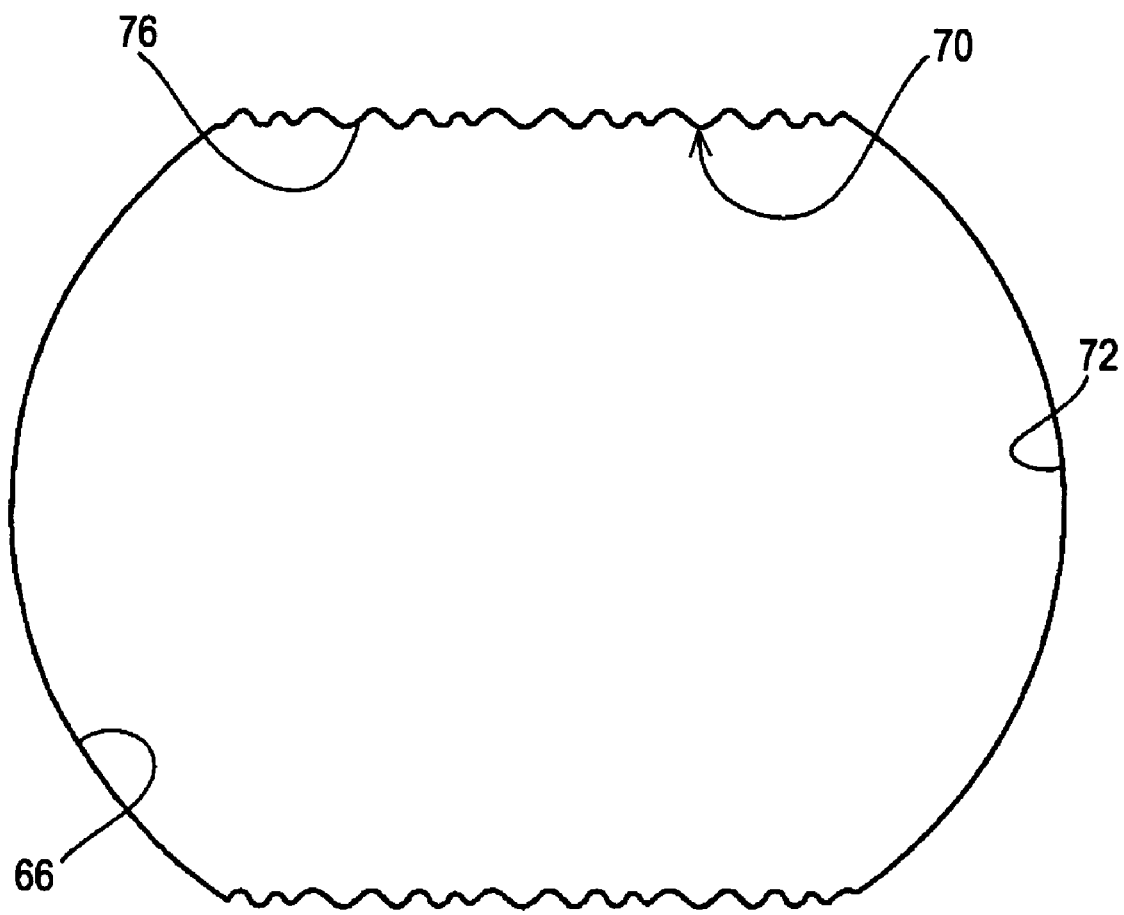
FIG. 13 is a plan view of an aperture of a fixed aperture stop according to a second embodiment.

FIG. 13 is a plan view of an aperture 66 of a fixed aperture stop 40 according to the second embodiment.

In the second embodiment, the projections and depressions 76 on each linear segment 70 are provided by alternately and repetitively arranging, in an orderly fashion, four kinds of wave patterns having different wavelengths and each constituted by a projection and a depression. Thus, the projections and depressions 76 form a pattern that appears as if the four kinds of wave patterns are combined.

The four kinds of wave patterns are all sine waves.

When the aperture width is 9.5 mm, the four kinds of wave patterns have wavelengths of 0.32 mm, 0.68 mm, 0.44 mm, and 0.56 mm, respectively, and all have the same amplitude of 0.2 mm. Thus, the wavelengths are 3.4%, 7.2%, 4.6%, and 5.9% with respect to the aperture width, and the amplitude is 2.1% with respect to the aperture width.

The second embodiment is similar to the first embodiment in that the amplitude of the four kinds of wave patterns be preferably set between 1% and 8% with respect to the aperture width, and that the wavelength of the four kinds of wave patterns be preferably set between 1% and 16% with respect to the aperture width in order to ensure a diffraction reducing effect (crepuscular-ray reducing effect) of the projections and depressions 76 and to prevent the wave patterns from being reflected on an image containing an out-of-focus area of a point source so as to ensure the quality of a picked-up image containing an out-of-focus area.

Although it is needless to say that the second embodiment can exhibit the same advantages as the first embodiment, the wave patterns in the second embodiment are more complex due to the projections and depressions 76 being provided by four kinds of projections and depressions, unlike the projections and depressions 76 in the first embodiment that are provided by two kinds of projections and depressions. Consequently, the second embodiment with these more complex wave patterns can further enhance the effect of preventing the occurrence of diffraction phenomenon, and is therefore more advantageous in terms of achieving an improved quality of a picked-up image.

Although four kinds of wave patterns are combined to form the projections and depressions 76 in the second embodiment, the wave patterns to be combined may alternatively be three kinds of wave patterns or five or more kinds of wave patterns.

Furthermore, the amplitude of the wave patterns does not necessarily have to be fixed.

Furthermore, the order of arrangement of the wave patterns is not limited.

Furthermore, the wave patterns of the projections and depressions 76 may be identical or different between the two linear segments 70.

Figure 14:
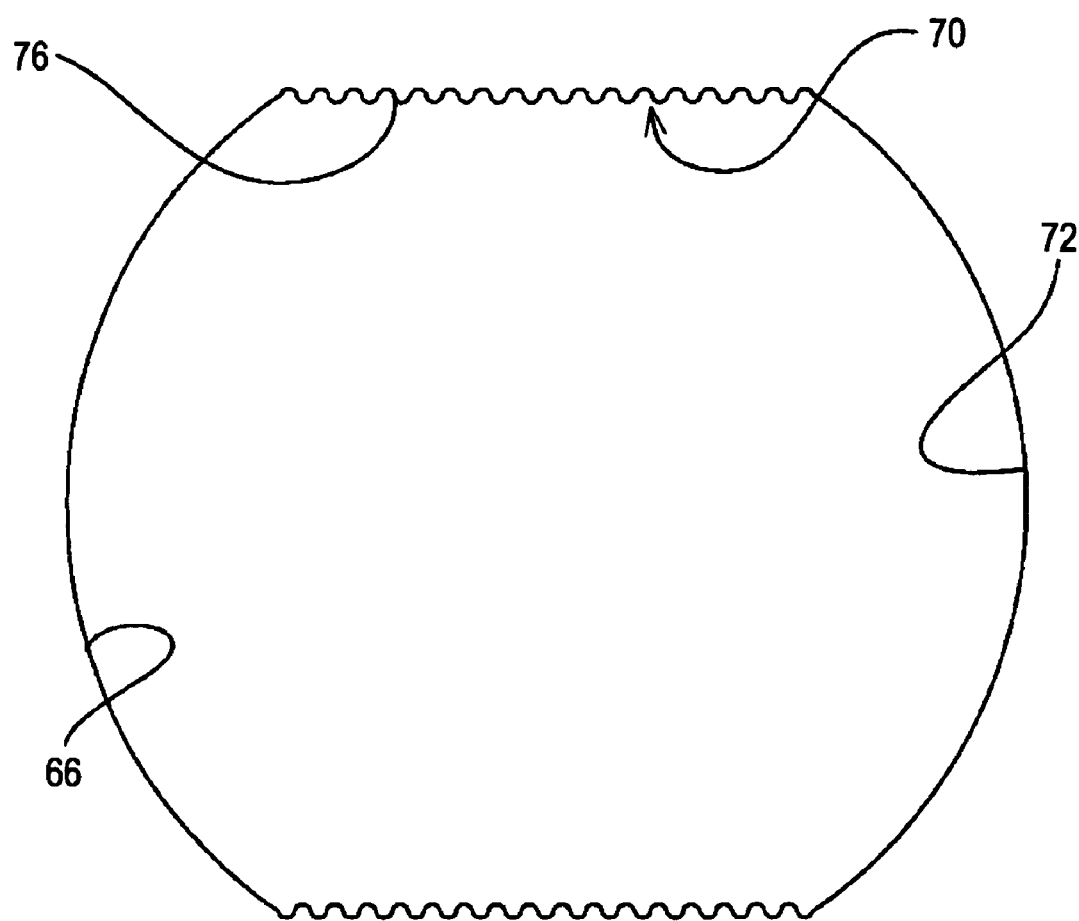
FIG. 14 is a plan view of an aperture of a fixed aperture stop according to a modification.

FIG. 14 is a plan view showing an aperture 66 that employs a modified wave pattern in which the projections and depressions 76 formed on each linear segment 70 are semicircular and have a uniform radius.

Although the projections and depressions 76 in this case can similarly prevent the occurrence of linearly extending crepuscular rays, the first and second embodiments having the combination of multiple kinds of wave patterns constituted by the projections and depressions 76 are more advantageous in terms of achieving an improved quality of a picked-up image.

A projection and a depression constituting each of the wave patterns of the projections and depressions 76 may have a shape of a truncated circle or ellipse, or have a shape of a truncated sine wave.

Alternatively, a projection and a depression constituting each of the wave patterns of the projections and depressions 76 may have a combination of a shape of a truncated circle or ellipse and a shape of a truncated sine wave.

As a further alternative, a projection and a depression constituting each of the wave patterns of the projections and depressions 76 may have a shape other than a shape of a truncated circle or ellipse or a shape of a truncated sine wave. In other words, each of the wave patterns of the projections and depressions 76 may be of any pattern that is capable of preventing the occurrence of diffraction phenomenon.

However, giving each of the wave patterns of the projections and depressions 76 a certain order facilitates the machining of the projections and depressions 76 and the quality control, and is therefore more advantageous in achieving higher mass productivity.

In the embodiments described above, the linear segments 70 are provided at upper and lower parts of the fixed aperture stop 40 since the edges E1 to E4 of the color separation prism 42 are located above and below the optical path of the image-pickup optical system 16.

However, if the edges of the color separation prism 42 are located only above or below the optical path of the image-pickup optical system 16, it is needless to say that only one linear segment 70 may be provided at an upper part or a lower part of the fixed aperture stop 40. In that case, a part of the edge section 68 excluding the linear segment 70 may be defined by a continuously extending arc segment.

Furthermore, although the above embodiments are directed to a case where the edge section 68 of the fixed aperture stop 40 is constituted by the two opposite linear segments 70 and the two opposite arc segments 72, the edge section 68 is not limited to this shape, and the following modifications are permissible.

Figure 15A:
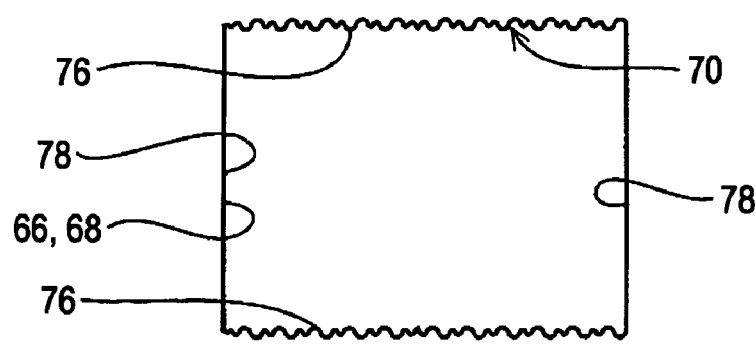
FIGS. 15A to 15D are plan views each showing an aperture of a fixed aperture stop according to another modification.

In a fixed aperture-stop 40 shown in FIG. 15A, the edge section 68 has two linear segments 70, and the opposite ends of the two linear segments 70 are connected by a pair of linear segments 78, thereby providing a rectangular aperture 66. The projections and depressions 76 are formed entirely on each linear segment 70.

Figure 15B:
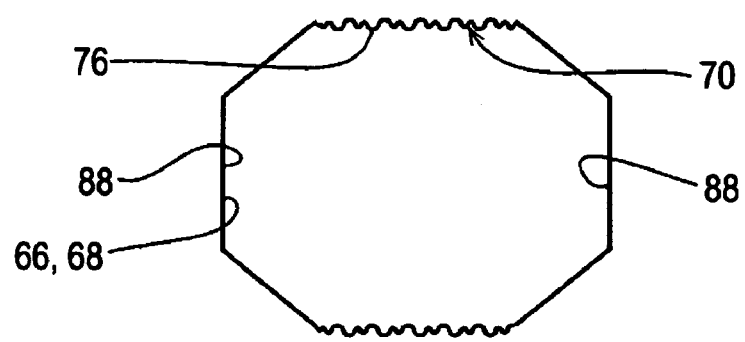

In a fixed aperture stop 40 shown in FIG. 15B, the edge section 68 has two linear segments 70, and the opposite ends of the two linear segments 70 are connected by two sets of three linear segments 88, thereby providing an octagonal aperture 66. The projections and depressions 76 are formed entirely on each linear segment 70.

Figure 15C:
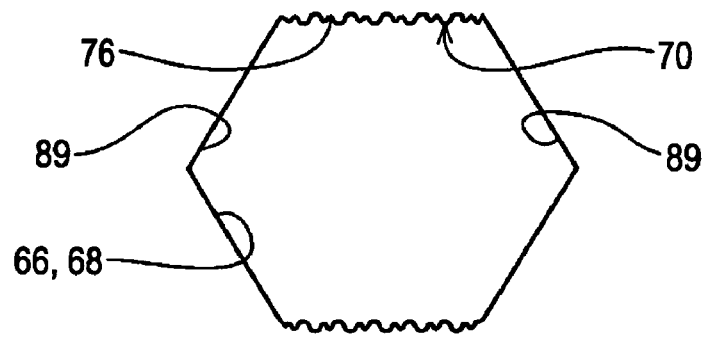

In a fixed aperture stop 40 shown in FIG. 15C, the edge section 68 has two linear segments 70, and the opposite ends of the two linear segments 70 are connected by two sets of two linear segments 89, thereby providing a hexagonal aperture 66. The projections and depressions 76 are formed entirely on each linear segment 70.

Figure 15D:
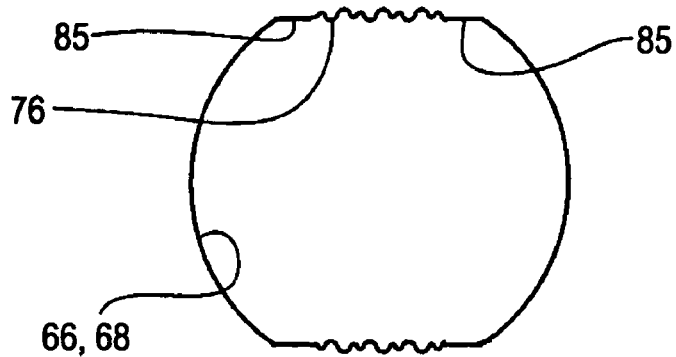

A fixed aperture stop 40 shown in FIG. 15D is similar to the first embodiment in that the edge section 68 is constituted by two opposite linear segments 70 and two opposite arc segments 72. However, the projections and depressions 76 on each linear segment 70 are formed only in a central part thereof, and the opposite ends of the linear segment 70 excluding the central part have linear portions 85 where the projections and depressions 76 are not formed.

The above-described modifications can exhibit similar advantages to those of the first embodiment.

Although the above embodiments are directed to a digital still camera as an example of an image pickup apparatus, the embodiments of the present invention can also be applied to various kinds of image pickup apparatuses, such as a video camcorder, a portable telephone equipped with a camera, a personal digital assistant (PDA), or a portable electronic apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus comprising:
   an image-pickup optical system;
   three color separation prisms that separate incident light guided by the image-pickup optical system into three light components of three primary colors and that emit the three light components; and
   three image pickup elements that respectively receive the three light components emitted from the color separation prisms so as to produce image signals corresponding to the three light components,
   wherein, of the three color separation prisms, a first color separation prism that first receives the incident light has an edge extending parallel to an incidence plane,
   wherein the image-pickup optical system includes a plurality of lenses, one of the lenses being a final lens disposed closest to the first color separation prism, and the image-pickup optical system has a plate-like fixed aperture stop disposed between the final lens and the first color separation prism,
   wherein the fixed aperture stop has an aperture that limits the incident light,
   wherein an edge section of the aperture has a plurality of projections and depressions arranged at least in parallel to the edge, as viewed from an optical-axis direction of the final lens,
   wherein the plurality of projections and depressions has a first set of projections and depressions with one of the first set of projections and depressions defining a first wave pattern and a second set of projections and depressions with one of the second set of projections and depressions defining a second wave pattern different from the first wave pattern and
   wherein the first set of projections and the second set of projections are arranged in a manner that one first wave pattern is disposed between and connected to two adjacent second wave patterns and one second wave pattern is disposed between and connected to two adjacent first wave patterns to form a repetitive sequence of the first and second wave patterns.

2. The image pickup apparatus according to claim 1, wherein the projections and depressions are formed in areas of the edge section that are parallel to the edge and that are opposed to each other.

3. The image pickup apparatus according to claim 1, wherein the projections and depressions are formed by alternately and repetitively arranging the first wave pattern and the second wave pattern in an orderly fashion, the first wave pattern including a projection and a depression and the second wave pattern including a projection and a depression that have a shape different from that of the projection and the depression included in the first wave pattern.

4. The image pickup apparatus according to claim 1, wherein the projections and depressions are formed by alternately and repetitively arranging the first wave pattern and the second wave pattern in an orderly fashion, the first wave pattern including a semicircular projection and a semicircular depression that have a uniform radius and the second wave pattern including a semicircular projection and a semicircular depression that have a uniform radius with a value different from that of the uniform radius of the semicircular projection and the semicircular depression included in the first wave pattern.

5. The image pickup apparatus according to claim 1, wherein the projections and depressions are formed by alternately and repetitively arranging, in an orderly fashion, multiple kinds of wave patterns having different wavelengths and different amplitudes and each including a projection and a depression.

6. The image pickup apparatus according to any one of claims 3 to 5, wherein the projection and the depression included in each wave pattern have a shape of a truncated circle or ellipse.

7. The image pickup apparatus according to any one of claims 3 to 5, wherein the projection and the depression included in each wave pattern have a shape of a truncated sine wave.

8. The image pickup apparatus according to any one of claims 3 to 5, wherein when a width of the aperture in a direction orthogonal to a linear segment in the edge section of the aperture is defined as an aperture width, an amplitude of each wave pattern is between 1% and 8% with respect to the aperture width, and a wavelength of each wave pattern is between 1% and 16% with respect to the aperture width.

* * * * *